(12) United States Patent
Berdichevsky et al.

(10) Patent No.: US 8,403,333 B2
(45) Date of Patent: Mar. 26, 2013

(54) ZERO TORQUE MEMBRANE SEAL

(75) Inventors: Alexander Berdichevsky, Farmington Hills, MI (US); David Sakata, Livonia, MI (US); Jianbin Jiang, Novi, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 144 days.

(21) Appl. No.: 12/885,000

(22) Filed: Sep. 17, 2010

(65) Prior Publication Data

US 2012/0068419 A1 Mar. 22, 2012

(51) Int. Cl.
*F16J 15/02* (2006.01)
(52) U.S. Cl. ......... 277/433; 277/353; 277/562; 277/577
(58) Field of Classification Search .......... 277/425, 277/423, 433, 351, 353, 562, 377, 577
See application file for complete search history.

(56) References Cited

U.S. PATENT DOCUMENTS

| | | | |
|---|---|---|---|
| 2,352,336 A * | 6/1944 | Martin et al. | 277/433 |
| 2,637,574 A * | 5/1953 | Diehl | 277/425 |
| 3,627,390 A | 12/1971 | Irwin | |
| 4,516,783 A * | 5/1985 | Mitsue et al. | 384/482 |
| 4,572,516 A | 2/1986 | Symons et al. | |
| 4,974,860 A * | 12/1990 | Anzue et al. | 277/424 |
| 5,147,139 A * | 9/1992 | Lederman | 384/486 |
| 5,407,213 A * | 4/1995 | Ouchi et al. | 277/317 |
| 5,975,534 A * | 11/1999 | Tajima et al. | 277/353 |
| 6,206,380 B1 * | 3/2001 | Miyazaki | 277/551 |
| 6,722,657 B2 | 4/2004 | Hood et al. | |
| 8,087,673 B2 * | 1/2012 | Kobayashi | 277/317 |
| 2009/0127796 A1 * | 5/2009 | Kanzaki et al. | 277/562 |

* cited by examiner

*Primary Examiner* — Vishal Patel
(74) *Attorney, Agent, or Firm* — Daniel J. Sepanik, Esq.; Harness, Dickey & Pierce, P.L.C.

(57) ABSTRACT

A low friction seal for sealing between a shaft and a bore and includes an inner case adapted to be mounted on the shaft. An outer case is adapted to be mounted within the bore. A seal element is mounted to the inner case and includes a base portion attached to the inner case. A membrane extends from the base portion and an axially extending leg extends from the membrane. A seal lip extends from the axially extending leg and sealingly engages a radially extending portion of the outer case. As the shaft rotates, the centrifugal forces tend to cause the membrane to flex and the torque loads applied by the dynamic seal are reduced to the point that the seal lip can lift off and apply zero torque load.

8 Claims, 6 Drawing Sheets

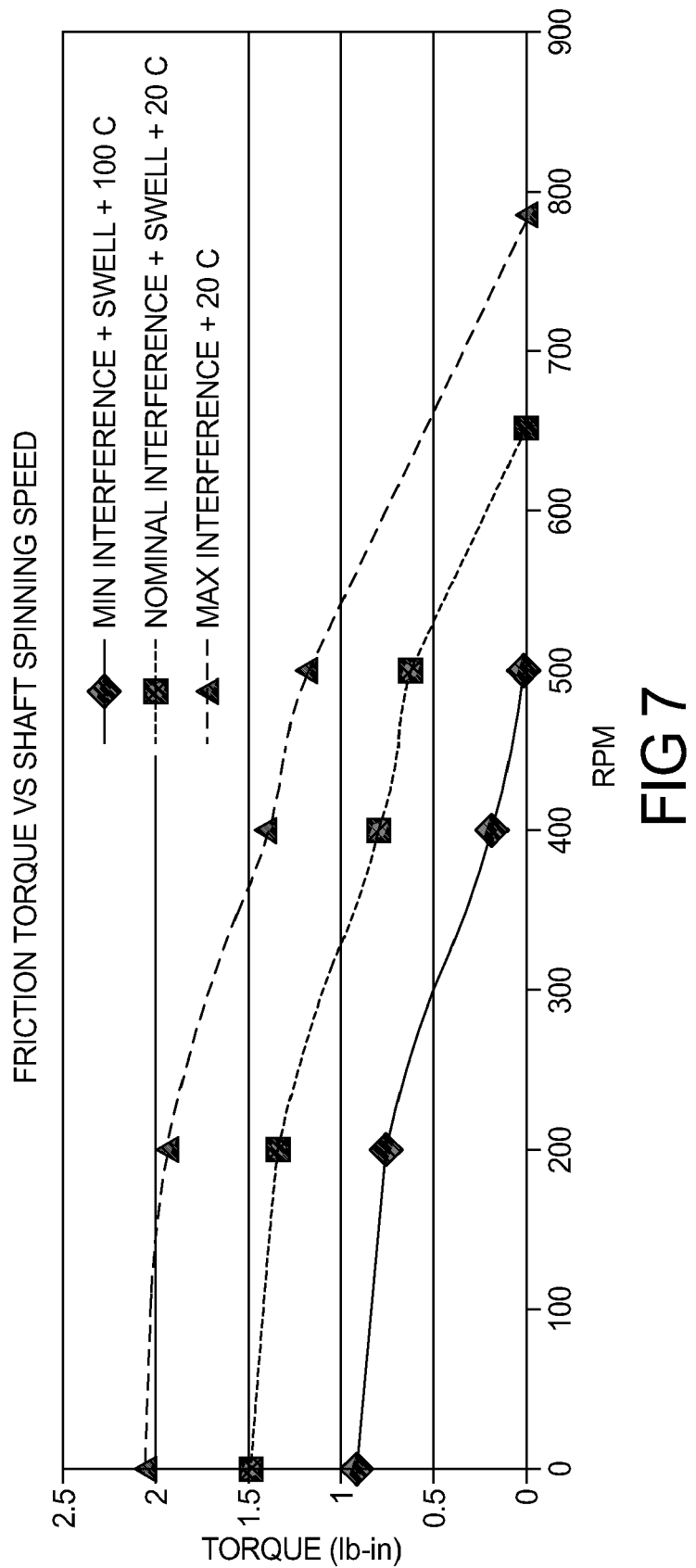

US 8,403,333 B2

ZERO TORQUE MEMBRANE SEAL

FIELD

The present disclosure relates to a zero torque membrane seal having reduced friction with seal lift off at high rotational speeds.

BACKGROUND AND SUMMARY

This section provides background information related to the present disclosure which is not necessarily prior art.

Dynamic seals are commonly used in combination with bearings to prevent water and dirt ingress from the outside environment into the bearing. The seal is also used to prevent grease loss from a bearing to the outside. The amount of torque that a seal applies to a rotating shaft system is a parasitic loss that can hinder the system's performance. Therefore, the amount of torque load applied by a dynamic seal is balanced with the seal's capability to adequately perform its sealing function.

Conventional dynamic seal designs have proven to adequately perform the function of preventing water and dirt ingress. However, the conventional dynamic seals can have torque loads of generally 30 pound-inches or larger. The conventional dynamic seals can often require a garter spring to apply added forces to the seal lip which adds torque load as well as added cost to the seal design.

According to one aspect, the present disclosure provides a low or zero friction seal for sealing between a shaft and a bore and includes an inner case adapted to be mounted on the shaft. An outer case is adapted to be mounted within the bore. A seal element is mounted to the inner case and includes a base portion attached to the inner case. A membrane extends from the base portion and a seal lip extends from the membrane and sealingly engages the outer case. As the shaft rotates, the centrifugal forces tend to cause the membrane portion to flex and the torque loads applied by the dynamic seal are reduced to the point that the seal lifts off of the outer case and applies zero torque load.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a torque versus rotation speed graph for an exemplary zero torque membrane seal constructed in accordance with the embodiments shown.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, components, and/or groups thereof.

When an element or layer is referred to as being "on", "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to," another element or layer, there may be no intervening elements or layers present. Other words used to describe the relationship between elements should be interpreted in a like fashion (e.g., "between" versus "directly between," "adjacent" versus "directly adjacent," etc.).

Spatially relative terms, such as "inner," "outer," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

Figure 1:
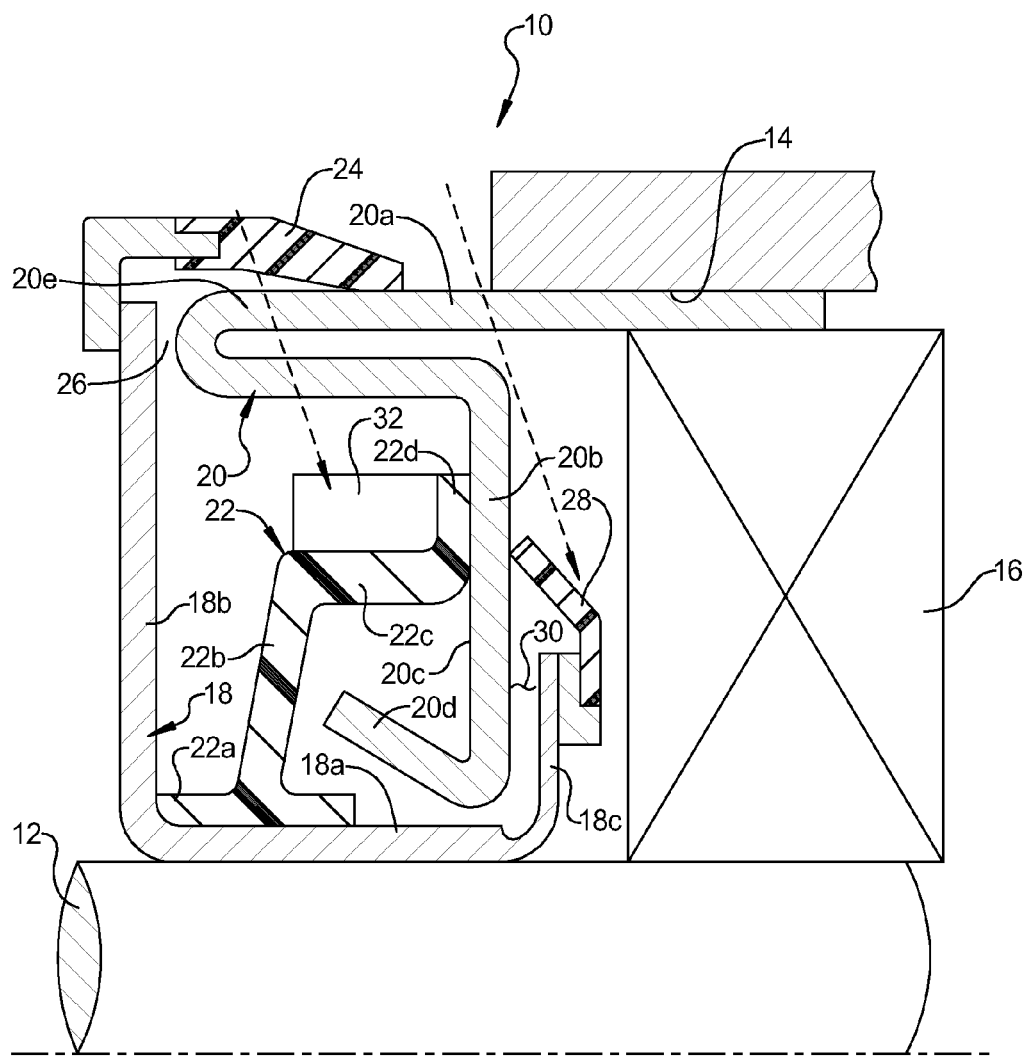
FIG. 1 is a cross-sectional view of a zero torque membrane seal assembly according to the principles of the present disclosure.
Figure 2:
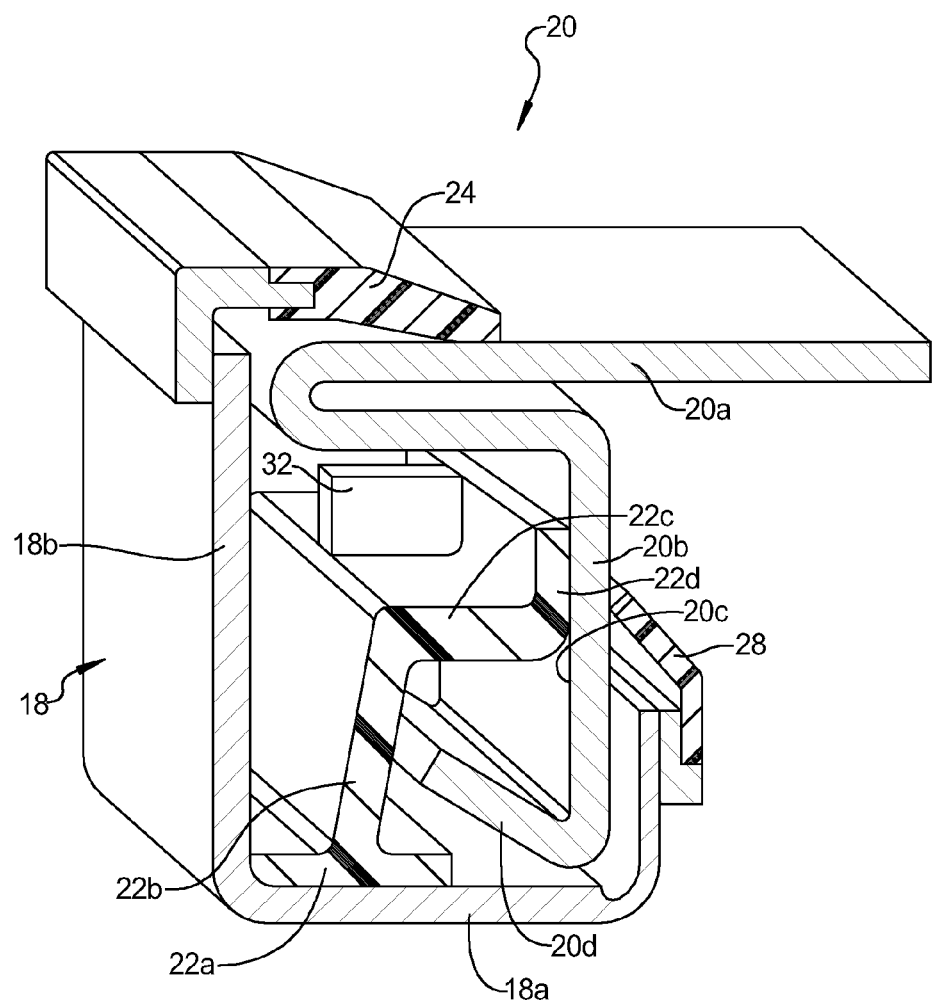
FIG. 2 is a partial sectional perspective view of the zero torque membrane seal assembly shown in FIG. 1.

With reference to FIGS. 1 and 2, a low/zero torque membrane seal assembly 10 will now be described. The membrane seal assembly 10 is provided for sealing an annular space between a rotating shaft 12 and a bore 14 that can be disposed in a housing or other structure. The membrane seal assembly 10 can be disposed adjacent to a bearing or journal 16 that can be disposed within the bore 14.

The membrane seal assembly 10 includes an inner case member 18 adapted to be frictionally mounted or otherwise secured (such as by press fit or adhesive) to the shaft 12 and an outer case member 20 adapted to be frictionally mounted or otherwise secured (such as by press fit or adhesive) within the bore 14. A seal element 22 is fixedly mounted to the inner case 18 and sealingly engages the outer case 20. The seal element 22 can be made from an elastomer, although plastics, composites, metals, and other materials can be used.

The inner case member 18 can be annular in shape and can include an inner generally cylindrical leg 18a that has an inner surface that frictionally engages the shaft 12. The inner case member 18 can include a radially outwardly extending exterior wall 18b extending from one end of the inner generally cylindrical leg 18a. The inner case member 18 can also include a radially outwardly extending interior wall 18c extending from a second end of the inner generally cylindrical leg 18a.

The outer case member 20 can be annular in shape and can include a generally cylindrical outer wall 20a adapted to be frictionally engaged within the bore 14. A radially inwardly extending wall 20b can extend inward from the outer wall portion 20a and can define a surface 20c against which the seal element 22 is sealingly engaged. A hook-shaped leg 20d can be disposed at a radially inner end of said radially inwardly extending wall 20a and can extend angularly in a radially outward direction toward said seal element 22. The hook-shaped leg 20d defines a labyrinth that can contain any fluid or debris that pass by the seal element 22 from the exterior. The outer case member 20 can also include an axially extending portion 20e that extends toward the exterior wall 18b of the inner case 18. A dust lip 24 can optionally be disposed on the outer end of the exterior wall 18b and can extend toward and over a gap 26 disposed between the exterior wall 18b and the axially extending portion 20e of the outer case member 20. An additional shielding feature 28 can optionally be disposed on the interior wall 18c of the inner case 18 to shield the gap 30 between the interior wall portion 18c and the radially inwardly extending wall 20b of the outer case member 20. The dust lip 24 and shielding feature 28 can have various forms.

Figure 3:
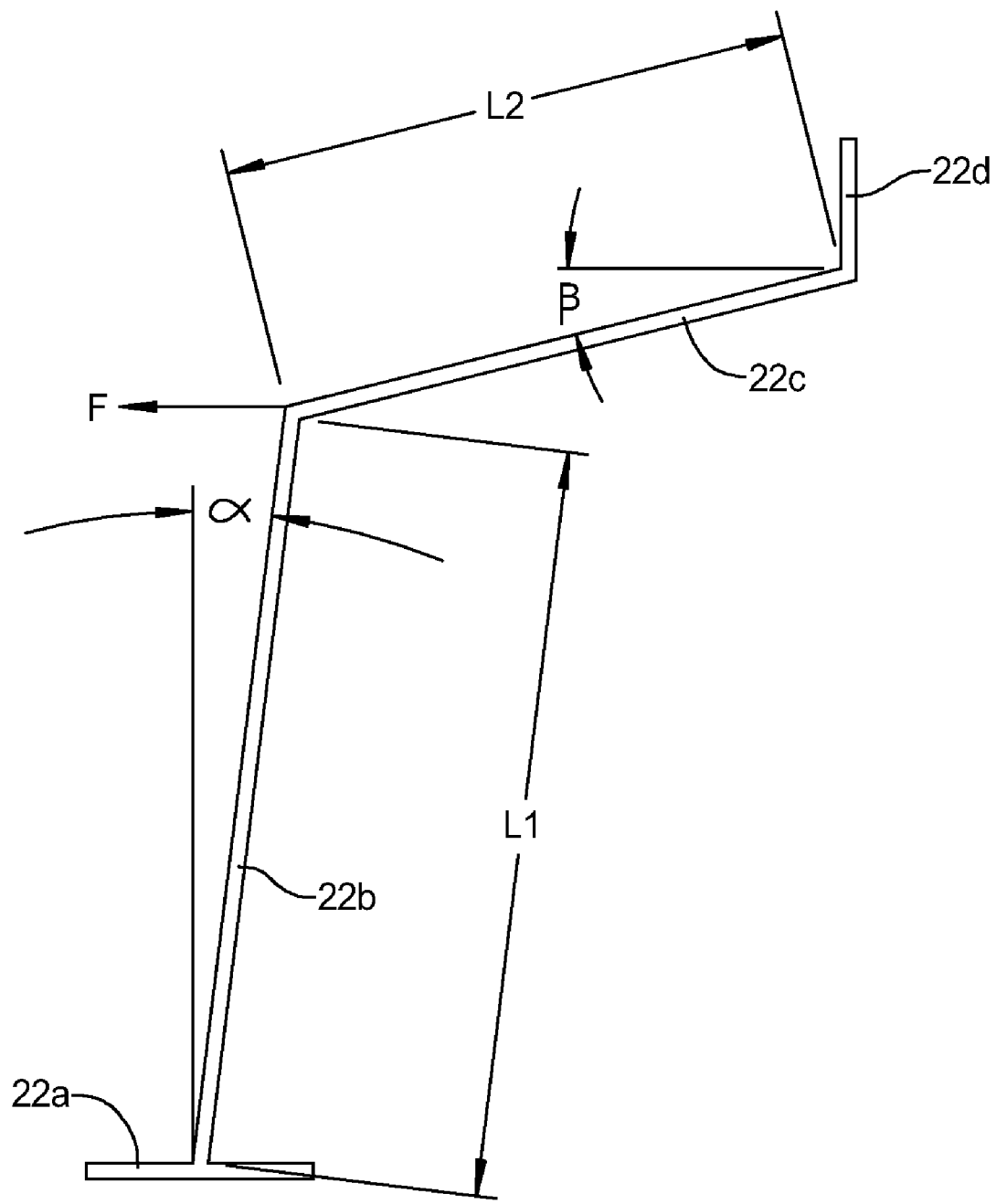
FIG. 3 is a force diagram for the zero torque membrane seal shown in FIG. 1.

The dust lip 24 and shielding feature 28 can be made from an elastomeric material and can be fastened to a metal base ring that is secured to the inner case 18 or can be otherwise fastened thereto. The seal element 22 can include a base portion 22a that is fixed to the inner generally cylindrical leg 18a. A membrane 22b extends radially from the base portion 22a. As shown in FIG. 1, the membrane 22b has a first axial face facing in a first axial direction relative to an axis of rotation of the shaft 12 and a second axial face facing in a second axial direction opposite the first axial direction. As shown in FIG. 1, the first and second axial faces of the membrane 22b are unconstrained by the inner case 18. An axially extending leg 22c extends from the membrane 22b and a seal lip 22d extends radially outward from the axially extending leg and engages the radially extending wall 20b of the outer case 20. A radially extending vane 32 can optionally extend from the axially extending leg 22c and can provide air disturbance in the area of the seal lip 22d to cause debris to be directed away from the interface region between seal lip 22d and surface 20c. The axially extending leg 22c is relatively thicker than the membrane 22b. With reference to the schematic force diagram of FIG. 3, the membrane 22b can be angularly disposed by an angle α relative to a transverse direction from an axis of the shaft 12 by an angle of between 0 and 45 degrees.

The membrane 22b and the axially extending leg 22c can have a length to thickness ratio of at least 4 in order to provide an appropriate amount of flexibility for providing reduced torque load and/or zero torque load at high relative speeds of rotation. According to a further aspect, with reference to FIG. 3, the axial stiffness $K^1_{axial}$ of the membrane 22b is less than:

$$\frac{M}{L \cdot \cos\alpha \cdot Int_0}$$

where
F=equivalent axial direction force
α=orientation (angle) of the membrane 22b
$L^1$=the length of membrane 22b
M=the moment that is generated by the centrifugal force to the anchor point of the membrane
Δ=rubber membrane deflection in the axial direction
$Int_0$=the initial interference between the seal lip and the metal case engaging surface $$\Delta = \frac{F_{axial}}{K^1_{axial}}$$

$$M = F_{axial} \cdot L^1 \cdot \cos\alpha$$

$$\Delta = \frac{M}{L^1 \cdot \cos\alpha \cdot K^1_{axial}}$$

In operation, as the rotation of the shaft 12 increases in speed, the axially extending leg 22c is acted upon by the centrifugal forces that tend to cause the membrane 22b to straighten out in a radial direction which tends to reduce the amount of applied seal force against the opposing surface 20c of the outer case 20 thereby reducing the torque load as the rotational speed of the shaft 12 increases. The optional dust lip 24 and shielding feature 28 can also be acted upon by the centrifugal forces that can lift these members to a non-contact state, as well.

With reference to FIG. 7, wherein the torque load is graphed versus rotational speed, it can be seen that a torque load continually decreases with increase in rotational speed until the rotational speed becomes sufficient to cause the seal lip to lift off the opposing surface so that zero torque load is applied by the membrane seal 10. In the graph shown in FIG. 7, the top graph line shows a maximum assembly interference between the seal element and contact surface at 20° C. while the bottom line illustrates a lower torque load due to a minimum assembly interference while the middle line illustrates the torque load for a membrane seal according to the present disclosure with a nominal assembly interference. As can be seen for the measured torque load values, the torque load ranges, at zero rotational speed, range from between approximately one and two pound-inch which is significantly lower than the torque load of the conventional dynamic seal which can be on the order of 30 pound-inch. In addition to the low friction torque at low speeds, the membrane seal 10, according to the principles of the present disclosure, can achieve reduced and/or zero torque loads at high relative rotational speeds ranging between 500 and 800 rpm depending upon the amount of interference involved.

Figure 4:
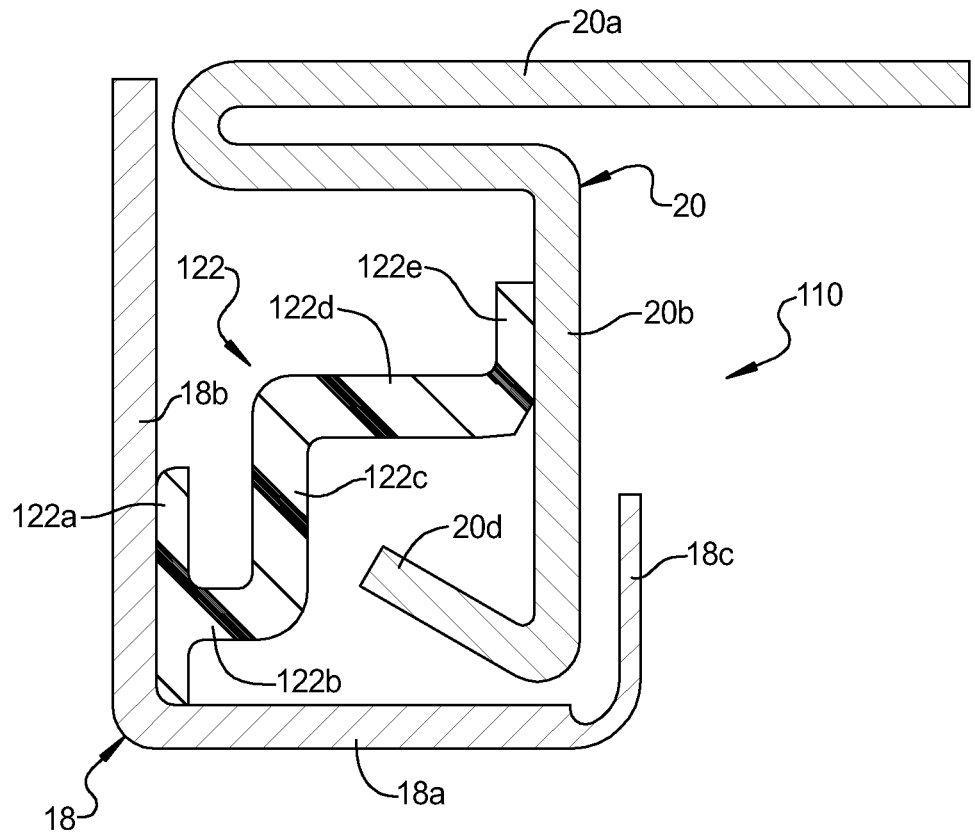
FIG. 4 is a cross-sectional view of a zero torque membrane seal assembly according to a second embodiment of the present disclosure.
Figure 5:
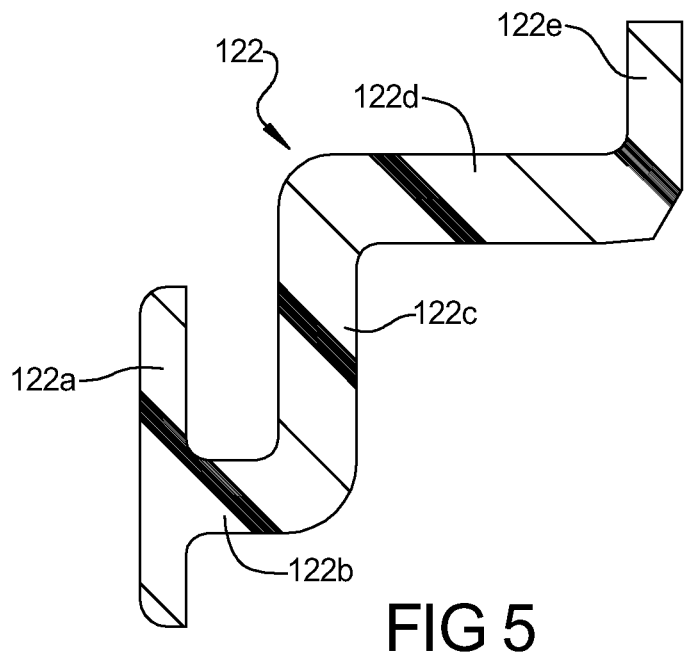
FIG. 5 is a sectional view of the seal lip shown in FIG. 4.
Figure 6:
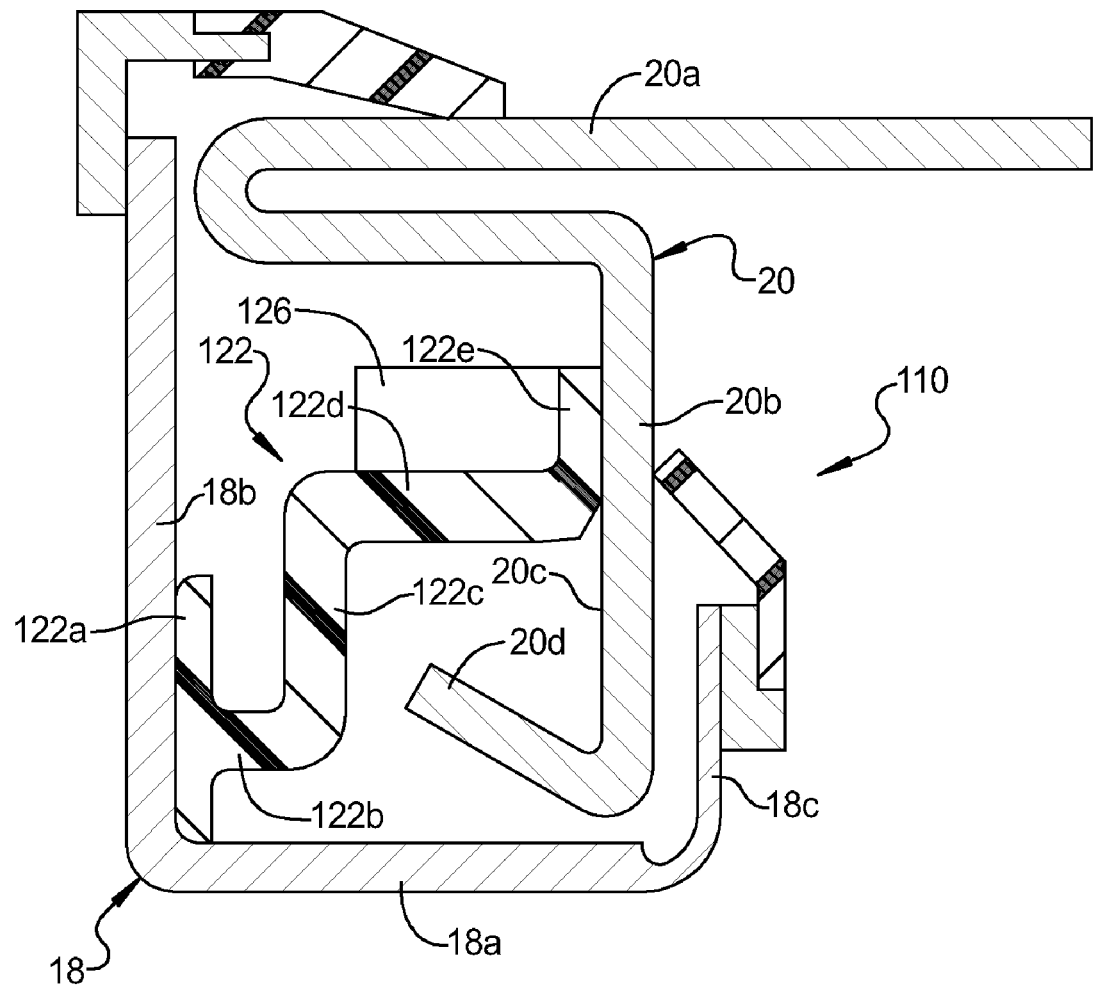
FIG. 6 is a cross-sectional view of a zero torque membrane seal according to a third embodiment of the present disclosure.

With reference to FIGS. 4 and 5, an alternative membrane seal assembly 110 will now be described, wherein the same or similar reference numerals are used to describe the same or similar components of the first embodiment. In the membrane seal assembly 110, the base portion 122a of the seal element 122 is affixed to the radially extending exterior wall 18b of the inner case 18. Furthermore, the membrane defines an elbow that includes an axial leg 122b that extends in a generally axial direction from the base portion 122a and a radial portion 122c that extends radially outward from a distal end of the axial leg 122b. A relatively thicker mass portion 122d extends from the axial leg membrane and a seal lip 122e extends from the relatively thicker mass portion 122d and engages the radially inwardly extending wall 20b of the outer case 20. With reference to FIG. 6, the seal element 122 can optionally include a series of radially extending vanes 126 that are circumferentially spaced from one another and that can cause air disturbance in the area of the seal interface to deflect debris away from the seal interface during rotation of the shaft 12.

In the membrane seal, as shown in FIGS. 4 and 5, the mass portion 122d is designed to react to centrifugal forces at higher rotational speeds to cause the membrane 122b, 122c to flex in a radially outward direction, thus reducing the torque load on the seal lip 122e at higher rotational speeds. It is anticipated that the mass portion 122d can be formed with slits therein in order to reduce the rigidity of the mass portion 122c. Furthermore, additional mass can be molded into the mass portion 122c by use of metals or other materials having a higher density than the material of the seal element 122 in order to reduce the volume taken up by the seal element 122. The membrane 122b, 122c is designed to be flexible and, therefore, has a total lineal length to thickness ratio of at least 4 in order to achieve the desired flexibility. The seal assembly 110 operates similar to seal 10 to provide reduced and/or zero torque loads.

With reference to FIG. 6, the seal assembly 110 is shown including an optional dust lip 24 disposed on an exterior wall 18b and can extend toward and over a gap 26 disposed between the exterior wall 18b and the axially extending portion 20a of the outer case member 20. An additional shielding feature 28 can optionally be disposed on the interior wall 18c of the inner case 18 to shield the gap 30 between the interior wall portion 18c and the radially inwardly extending wall 20b of the outer case member.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A low friction seal for sealing between a shaft and a bore, comprising:
    an inner case adapted to be mounted on the shaft;
    an outer case adapted to be mounted within the bore;
    a seal element mounted to said inner case and including a base portion attached to said inner case, a membrane extending from said base portion, said membrane having a first axial face facing in a first axial direction relative to an axis of rotation of the shaft and a second axial face facing in a second axial direction opposite to said first axial direction and said first and second axial faces of said membrane do not directly contact said inner case, an axially extending leg relatively thicker than said membrane and extending from said membrane and a seal lip extending radially outwardly from said axially extending leg and engaging a radially extending portion of said outer case, wherein said membrane has a length to thickness ratio of at least 4 and said membrane extends angularly by an angle relative to a transverse direction from the axis of rotation of the shaft that is greater than 0 degrees and less than 45 degrees, wherein at low rotational speeds of the shaft, the seal lip engages said radially extending portion of said outer case and at a relatively higher rotational speed of the shaft, the seal lip lifts off of said radially extending portion of said outer case.

2. The low friction seal according to claim 1, wherein said outer case includes an angled wall portion extending from an inner end of said radially extending portion toward said seal element.

3. The low friction seal according to claim 1, wherein during non-rotation, said seal lip is in engagement with said radially extending portion of said outer case along a majority of a surface of said seal lip.

4. The low friction seal according to claim 1, wherein said inner case includes a radially outwardly extending portion including a dust lip at an end thereof extending toward said outer case.

5. The low friction seal according to claim 1, wherein said inner case includes a radially outwardly extending portion disposed on a side of said radially extending portion of said outer case opposite said seal element.

6. A low friction seal for sealing between a shaft and a bore, comprising:
    an inner case adapted to be mounted on the shaft;
    an outer case adapted to be mounted within the bore and including a radially inwardly extending portion;
    a seal element mounted to said inner case and including a base portion attached to said inner case, a membrane extending from said base portion, a mass portion extending axially from said membrane and having a thickness greater than said membrane and a seal lip extending from said mass portion and engaging said radially inwardly extending portion of said outer case;
    wherein said outer case includes a hook portion extending radially outwardly from an inner end of said radially inwardly extending portion and toward said seal element.

7. The low friction seal according to claim 6, wherein at low rotational speeds of the shaft, the seal lip engages said radially extending portion of said outer case and at relatively higher rotational speeds of the shaft, the seal lip lifts off of said radially extending portion of said outer case.

8. The low friction seal according to claim 6, wherein said membrane portion has a length to thickness ratio of at least 4.

* * * * *